United States Patent
Chhabra et al.

(10) Patent No.: US 10,372,628 B2
(45) Date of Patent: Aug. 6, 2019

(54) CROSS-DOMAIN SECURITY IN CRYPTOGRAPHICALLY PARTITIONED CLOUD

(71) Applicant: Intel Corporation, Santa Clara, CA (US)

(72) Inventors: Siddhartha Chhabra, Hillsboro, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 15/720,521

(22) Filed: Sep. 29, 2017

(65) Prior Publication Data
US 2019/0102322 A1  Apr. 4, 2019

(51) Int. Cl.
| | |
|---|---|
| *G06F 12/14* | (2006.01) |
| *H04L 9/14* | (2006.01) |
| *H04L 9/08* | (2006.01) |
| *G06F 12/0811* | (2016.01) |

(52) U.S. Cl.
CPC ...... *G06F 12/1408* (2013.01); *G06F 12/0811* (2013.01); *H04L 9/0894* (2013.01); *H04L 9/14* (2013.01); *G06F 2212/1052* (2013.01); *G06F 2212/60* (2013.01); *G06F 2212/62* (2013.01)

(58) Field of Classification Search
None
See application file for complete search history.

(56) References Cited

U.S. PATENT DOCUMENTS

| | | | | |
|---|---|---|---|---|
| 5,787,175 A | * | 7/1998 | Carter | G06F 21/6209 707/999.008 |
| 6,011,847 A | * | 1/2000 | Follendore, III | G06F 21/6209 380/262 |
| 6,272,537 B1 | * | 8/2001 | Kekic | G06F 8/34 709/203 |
| 6,289,382 B1 | * | 9/2001 | Bowman-Amuah | G06F 13/387 709/226 |
| 6,332,163 B1 | * | 12/2001 | Bowman-Amuah | H04L 12/4604 709/217 |
| 6,339,832 B1 | * | 1/2002 | Bowman-Amuah | G06F 9/542 710/266 |

(Continued)

*Primary Examiner* — William J. Goodchild
(74) *Attorney, Agent, or Firm* — Schwegman Lundberg & Woessner, P.A.

(57) ABSTRACT

Solutions for secure memory access in a computing platform, include a multi-key encryption (MKE) engine as part of the memory interface between processor core(s) and memory of a computing platform. The processor core(s) perform workloads, each utilizing allocated portions of memory. The MKE engine performs key-based cryptography operations on data to isolate portions of the memory from workloads to which those portions of the memory are not allocated. A key-mapping data store is accessible to the MKE engine and contains associations between identifiers of portions of the memory, and corresponding key identification data from which cryptographic keys are obtained. A key tracking log is maintained by the MKE engine, and the MKE engine temporarily stores entries in the key tracking log containing the identifiers of the portions of the memory and key identification data for those portions of memory during memory-access operations of those portions of memory.

25 Claims, 8 Drawing Sheets

(56) References Cited

U.S. PATENT DOCUMENTS

| | | | | |
|---|---|---|---|---|
| 6,664,978 B1* | 12/2003 | Kekic | .................. | H04L 41/0213 |
| | | | | 709/203 |
| 2002/0092019 A1* | 7/2002 | Marcus | ................ | G11B 27/034 |
| | | | | 725/37 |
| 2003/0191719 A1* | 10/2003 | Ginter | ..................... | G06F 21/10 |
| | | | | 705/54 |
| 2004/0103305 A1* | 5/2004 | Ginter | ..................... | G06F 21/10 |
| | | | | 726/27 |
| 2011/0251992 A1* | 10/2011 | Bethlehem | .......... | H04L 12/2863 |
| | | | | 707/610 |
| 2013/0073388 A1* | 3/2013 | Heath | .................... | G06Q 50/01 |
| | | | | 705/14.53 |
| 2017/0286525 A1* | 10/2017 | Li | ......................... | G06F 16/287 |

\* cited by examiner

CROSS-DOMAIN SECURITY IN CRYPTOGRAPHICALLY PARTITIONED CLOUD

TECHNICAL FIELD

Embodiments described herein generally relate to information systems and computing architecture and, more particularly, to a system architecture and operability for preventing information leaks and cross-domain attacks in cryptographically isolated domains in a secure public cloud.

BACKGROUND

Cloud-computing and software-as-a-service (SAAS) providers operate increasingly complex computer servers and server farms, where information security remains a top concern. Recent advances in security include cryptographic isolation between customer workloads, typically implemented as distinct virtual machines (VMs) running on a common platform.

One security approach involves the use of multi-key total memory encryption (MKTME) where a hypervisor may assign a cryptographic key to each of the customer workloads running in its own VM. Each workload may use its key to protect information that it stores in the server's physical memory. A secure MKTME engine may be used as part of the memory-access subsystem to perform encryption and decryption operations as part of providing secured memory access.

Although MKTME has shown much promise as an effective component of a server's system architecture for improving isolation between customer workloads, some important challenges remain to be solved. These include protection from certain types of attacks, such as hardware-replay attacks, and cross-domain injection attacks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

DETAILED DESCRIPTION

Figure 1:
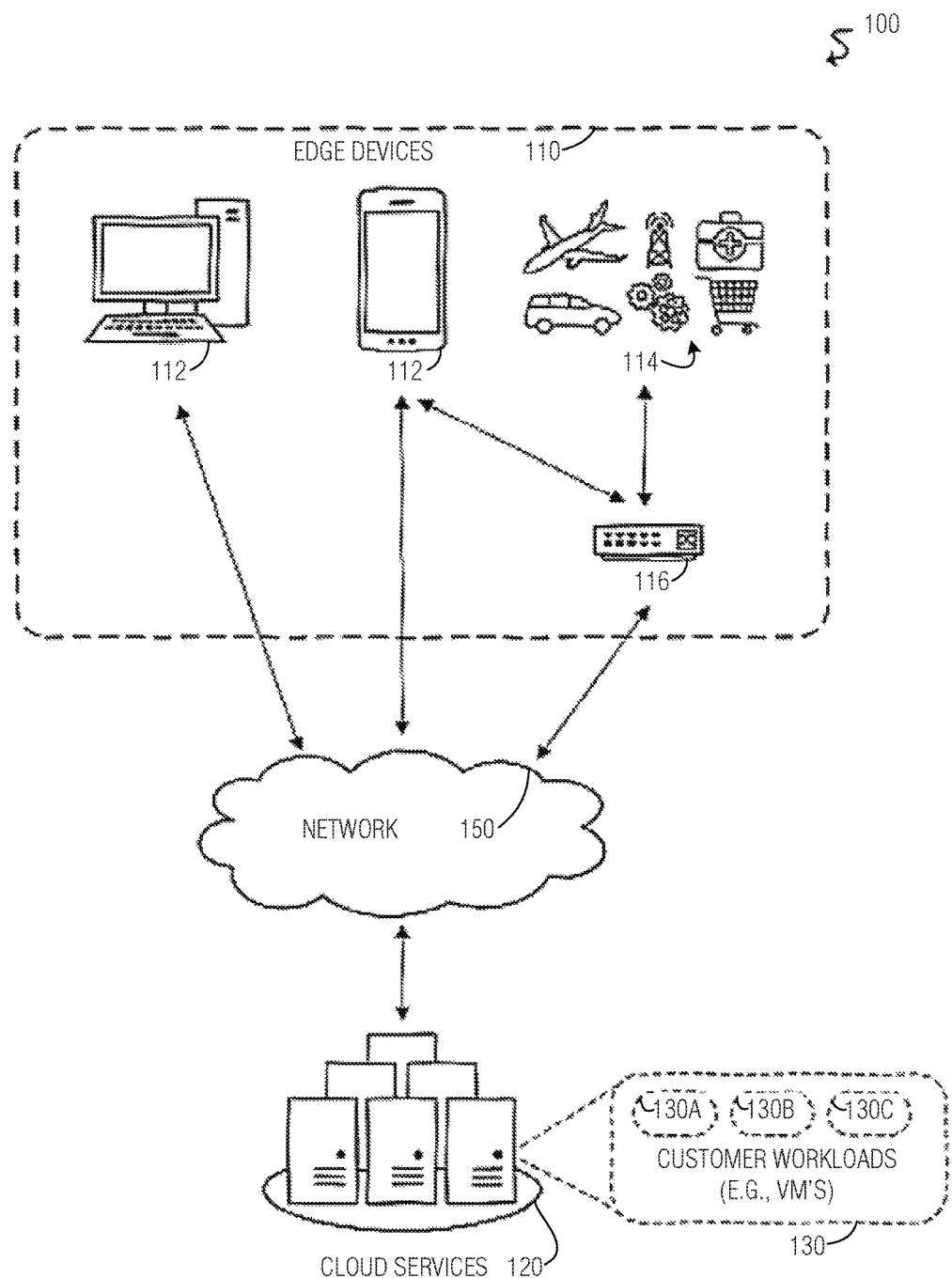
FIG. 1 is a schematic diagram illustrating an example computing system including edge devices and cloud services, in which cryptographic memory protection may be implemented according to various embodiments.

Aspects of this disclosure are directed to cryptographic memory protection. The described embodiments may be used to provide memory encryption protection, thus providing an additional layer of security by plugging the hole associated with unprotected or insecure memory. For example, in some embodiments, memory encryption may be provided by implementing a cryptographic engine or controller on the memory path or memory bus. In this manner, data may be encrypted and protected while residing in memory and during transmission to and from memory (e.g., when transmitted from memory to a processor, and vice versa, via the memory bus or memory path). However, while memory encryption may be a necessity for certain users or use cases, uniform memory protection across a computing system may be insufficient in certain circumstances. For example, a cloud service provider often hosts data or applications—or workloads—for multiple customers or third parties. Moreover, the cloud service provider could use memory encryption to provide uniform protection of all hosted customer workloads, for example, using a single encryption key. However, simply providing uniform memory encryption protection for all hosted workloads—without differentiating between the workloads of different customers—may be insufficient. For example, a cloud service provider or its customers may be averse to sharing the same encryption key for all customers. Rather, the cloud service provider or its customers may prefer to have memory encryption provided on a per-tenant basis (e.g., per customer or per virtual machine) to ensure that each customer workload is separately protected and isolated using a unique encryption key.

Accordingly, aspects of the described embodiments provide memory encryption that supports multiple keys. The number of supported keys, for example, may be implementation-dependent. In an example, for example, a memory protection engine may be configured or programmed (e.g., by software) to encrypt different regions or pages of memory using different encryption keys or algorithms. For example, in an example, a user or tenant (e.g., a cloud service provider or customer) may designate a protection mode for a particular region or page of memory as either plaintext (e.g., unencrypted), standard or default encryption protection (e.g., encrypted using a default or global encryption key), or custom encryption protection (e.g., encrypted using a unique encryption key). In this manner, memory encryption may be provided and configured separately for different tenants, customers, or protection domains. In an example, for example, a "domain" may be viewed as a collection of resources associated with a particular workload, which may include any regions of memory containing data associated with the workload. Moreover, memory encryption may be configured separately for each domain, thus allowing each domain or workload to be protected using a separate encryption key. In this manner, cryptographic isolation may be achieved for workloads of different tenants, customers, or users. Moreover, the workloads may also be isolated from management software (e.g., of a cloud service provider), such as a hypervisor. Domains may also be configured in plaintext mode, as it may be undesirable in certain circumstances to perform memory encryption for a particular domain (e.g., to avoid performance impacts of memory encryption, share memory (and I/O) between different entities, reclaim memory, and so forth).

The described embodiments may also be used to protect data when using memory for persistent data storage, such as storage class memory (SCM) and other forms of flash and solid-state storage (e.g., non-volatile dual in-line memory modules (NVDIMM), direct access storage (DAS) memory, and the like). For example, when persistent data storage is provided using memory rather than disk-based storage, disk encryption software may be unable to adequately protect the stored data if memory encryption is not supported. Accordingly, the described embodiments may be used to protect data using memory encryption when memory is used for persistent data storage.

FIG. 1 is a schematic diagram illustrating an example computing system 100. In various embodiments, system 100 or its underlying components may include the cryptographic memory protection functionality described throughout this disclosure. For example, a cloud service provider 120 may host workloads 130 (e.g., virtual machines) for multiple customers or third parties. Accordingly, in an example, a cloud service provider 120 may implement multi-key cryptographic memory protection to provide memory encryption on a per-tenant basis, thus ensuring that each customer workload 130 is separately protected and isolated using a unique encryption key. Cryptographic memory protection may also be implemented by other components of system 100, such as edge devices 110.

Edge devices 110 may include any equipment or devices deployed or connected near the "edge" of a communication system 100. In the illustrated embodiment, edge devices 110 include end-user devices 112 (e.g., desktops, laptops, mobile devices), Internet-of-Things (IoT) devices 114, and networking devices 116 such as gateways or routers, among other examples. Edge devices 110 may communicate with each other or with other remote networks and services (e.g., cloud services 120) through one or more networks or communication protocols, such as communication network 150. Moreover, in an example, certain edge devices 110 may include the cryptographic memory protection functionality described throughout this disclosure.

End-user devices 112 may include any device that enables or facilitates user interaction with computing system 100, including, for example, desktop computers, laptops, tablets, mobile phones and other mobile devices, and wearable devices (e.g., smart watches, smart glasses, headsets), among other examples.

IoT devices 114 may include any device capable of communicating or participating in an Internet-of-Things (IoT) system or network. IoT systems may refer to new or improved ad-hoc systems and networks composed of multiple different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor or communication interface to allow interoperation with other components of system 100, such as with cloud services 120 or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

Cloud services 120 may include services that are hosted remotely over a network 150, or in the "cloud." In an example, cloud services 120 may be remotely hosted on servers in datacenter (e.g., application servers or database servers). Cloud services 120 may include any services that may be utilized by or for edge devices 110, including but not limited to, data and application hosting, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. Moreover, in an example, certain cloud services 120 may include the cryptographic memory protection functionality described throughout this disclosure. For example, a cloud service provider 120 often hosts workloads 130 (e.g., data or applications) for multiple customers or third parties. Accordingly, in an example, a cloud service provider 120 may implement multi-key cryptographic memory protection to provide memory encryption on a per-tenant basis, thus ensuring that each customer workload 130 is separately protected and isolated using a unique encryption key.

Network 150 may be used to facilitate communication between the components of computing system 100. For example, edge devices 110, such as end-user devices 112 and IoT devices 114, may use network 150 to communicate with each other or access one or more remote cloud services 120. Network 150 may include any number or type of communication networks, including, for example, local area networks, wide area networks, public networks, the Internet, cellular networks, Wi-Fi networks, short-range networks (e.g., Bluetooth or ZigBee), or any other wired or wireless networks or communication mediums.

The example embodiments described herein may include, or may operate on, logic or a number of components, modules, circuits, or engines, which for the sake of consistency are termed engines, although it will be understood that these terms may be used interchangeably. Engines may be hardware, software, or firmware communicatively coupled to one or more electronic circuits in order to carry out the operations described herein. Engines include hardware and, as such, engines are tangible entities capable of performing specified operations and may be configured or arranged in any suitable manner. In an example, electronic circuitry may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine-readable medium (for instance, a non-transitory storage medium, such as a hardware storage device). In an example, the software, when executed by the underlying hardware of the engine, causes the hardware to perform the specified operations.

Accordingly, the term engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

Figure 2:
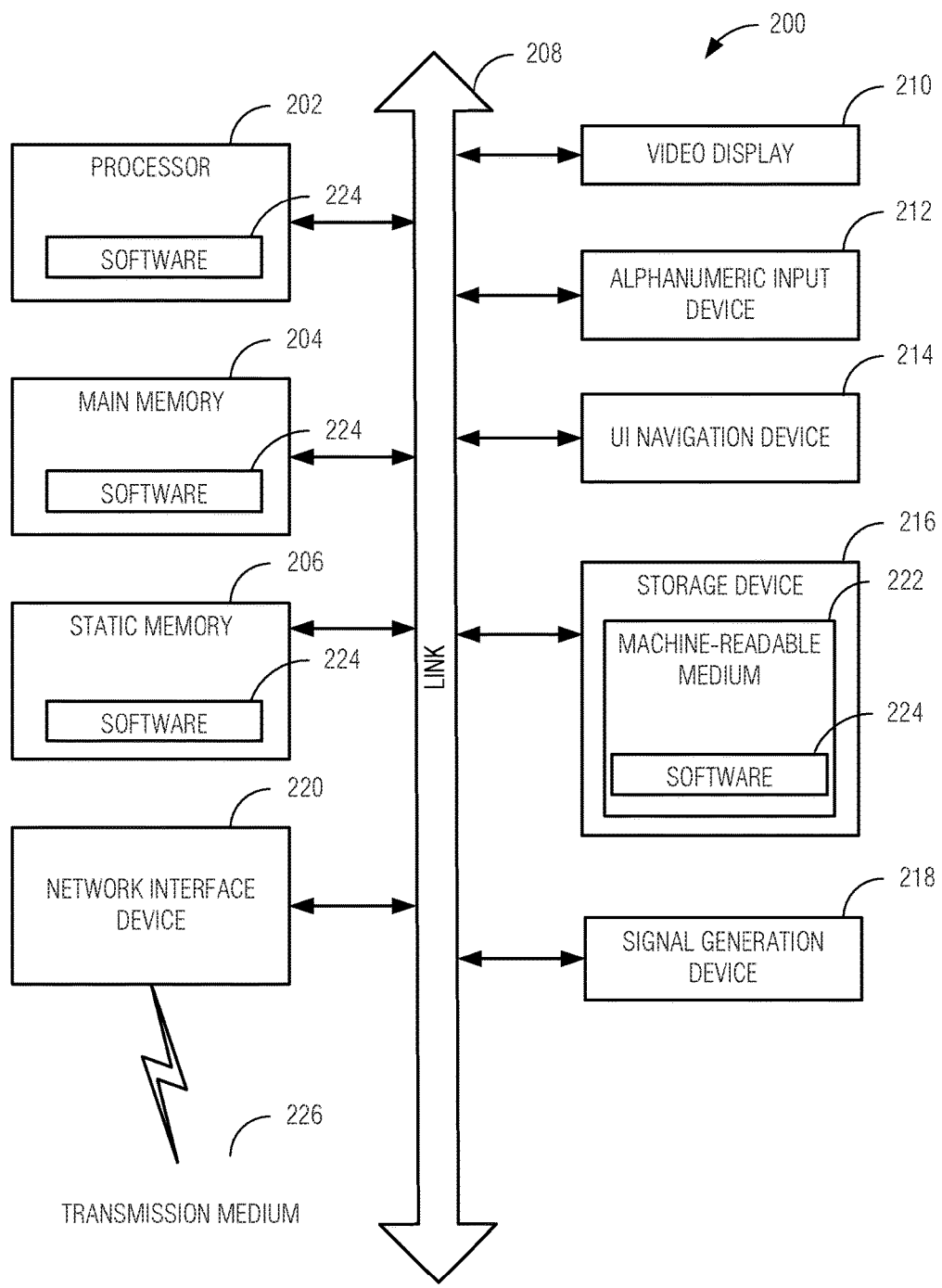
FIG. 2 is a high-level block diagram illustrating a host machine platform, which may implement all, or portions of, edge devices or cloud services of FIG. 1 according to various embodiments.

FIG. 2 is a high-level block diagram illustrating a host machine platform, which may implement all, or portions of, edge devices 110 or cloud services 120 of FIG. 1 according to various embodiments. In certain embodiments, programming of the computer system 200 according to one or more particular algorithms produces a special-purpose machine upon execution of that programming. In a networked deployment, the host machine may operate in the capacity of either a server or a client machine in server-client network environments, or it may act as a peer machine in peer-to-peer (or distributed) network environments. The host machine may take any suitable form factor, such as a personal computer (PC) workstation, a server, whether rack-mounted, or stand-alone, a mainframe computer, a cluster computing system, or the like, a set-top box, as well as a mobile or portable computing system, such as a laptop/notebook PC, an onboard vehicle system, wearable device, a tablet PC, a hybrid tablet, a personal digital assistant (PDA), a mobile telephone or, more generally, any machine capable of executing instructions (sequential or otherwise) that specify actions to be taken by that machine.

Example host machine 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The host machine 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The host machine 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, or within the processor 202 during execution thereof by the host machine 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) interconnect, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
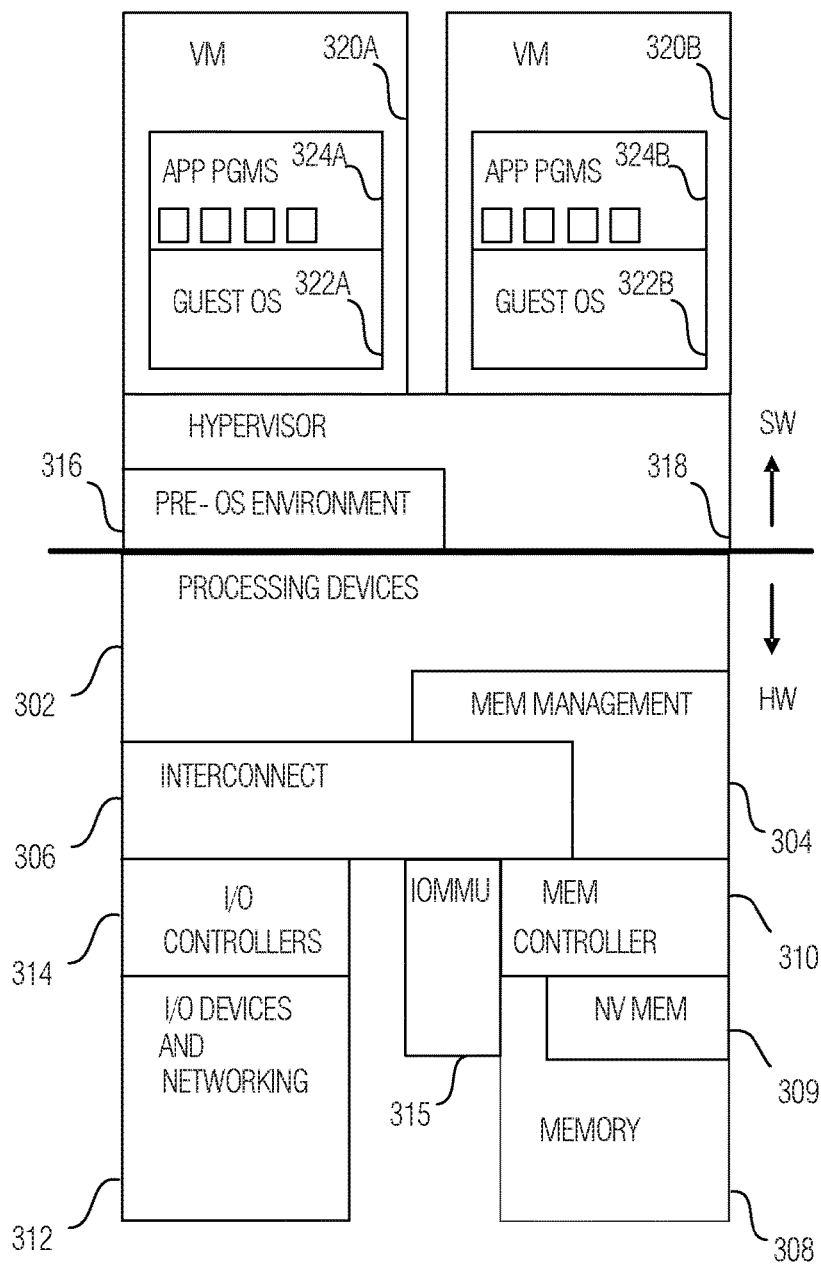
FIG. 3 is a diagram illustrating an example computing hardware and software architecture of a computer system such as the one depicted in FIG. 2, in which various interfaces between hardware components and software components are shown.

FIG. 3 is a diagram illustrating an example computing hardware and software architecture of a computer system such as the one depicted in FIG. 2, in which various interfaces between hardware components and software components are shown. As indicated by the "HW" label, hardware components are represented below the divider line, whereas software components denoted by the "SW" label reside above the divider line. On the hardware side, processing devices 302 (which may include one or more microprocessors, digital signal processors, etc.), each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI-e, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. I/O devices, including video and audio adapters, non-volatile storage, external peripheral links such as USB, personal-area networking (e.g., Bluetooth), etc., camera/microphone data capture devices, fingerprint readers and other biometric sensors, as well as network interface devices such as those communicating via Wi-Fi or LTE-family interfaces, are collectively represented as I/O devices and networking 312, which interface with interconnect 306 via corresponding I/O controllers 314.

In a related embodiment, input/output memory management unit IOMMU 315 supports secure direct memory access (DMA) by peripherals. IOMMU 315 may provide memory protection by meditating access to memory 308 from I/O device 312. IOMMU 315 may also provide DMA memory protection in virtualized environments, where it allows certain computing hardware resources to be assigned to certain guest VMs running on the system, and enforces isolation between other VMs and peripherals not assigned to them.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316 is responsible for initiating the launching of the operating system or virtual machine manager, but also provides an execution environment for embedded applications.

Hypervisor 318 is system software that creates and controls the execution of virtual machines (VMs) 320A and 320B. hypervisor 318 may run directly on the hardware HW, as depicted, or hypervisor 318 may run under the control of an operating system as a hosted hypervisor. Each VM 320A, 320B includes a guest operating system 322A, 322B, and application programs 324A, 324B.

Each guest operating system (OS) 322A, 322B provides a kernel that operates via the resources provided by hypervisor 318 to control the hardware devices, manage memory access for programs in memory, coordinate tasks and facilitate multi-tasking, organize data to be stored, assign memory space and other resources, load program binary code into memory, initiate execution of the corresponding application program which then interacts with the user and with hardware devices, and detect and respond to various defined interrupts. Also, each guest OS 322A, 322B provides device drivers, and a variety of common services such as those that facilitate interfacing with peripherals and networking, that provide abstraction for corresponding application programs 324A, 324B so that the applications do not need to be responsible for handling the details of such common operations. Each guest OS 322A, 322B additionally may provide a graphical user interface (GUI) that facilitates interaction with the user via peripheral devices such as a monitor, keyboard, mouse, microphone, video camera, touchscreen, and the like. In an example, guest OS 322B may omit a GUI.

Each guest OS 322A, 322B may provide a runtime system that implements portions of an execution model, including such operations as putting parameters onto the stack before a function call, the behavior of disk input/output (I/O), and parallel execution-related behaviors.

In addition, each guest OS 322A, 322B may provide libraries that include collections of program functions that provide further abstraction for application programs. These include shared libraries, dynamic linked libraries (DLLs), for example.

Application programs 324A, 324B are those programs that perform useful tasks for users, beyond the tasks performed by lower-level system programs that coordinate the basis operability of the computer system itself.

Figure 4:
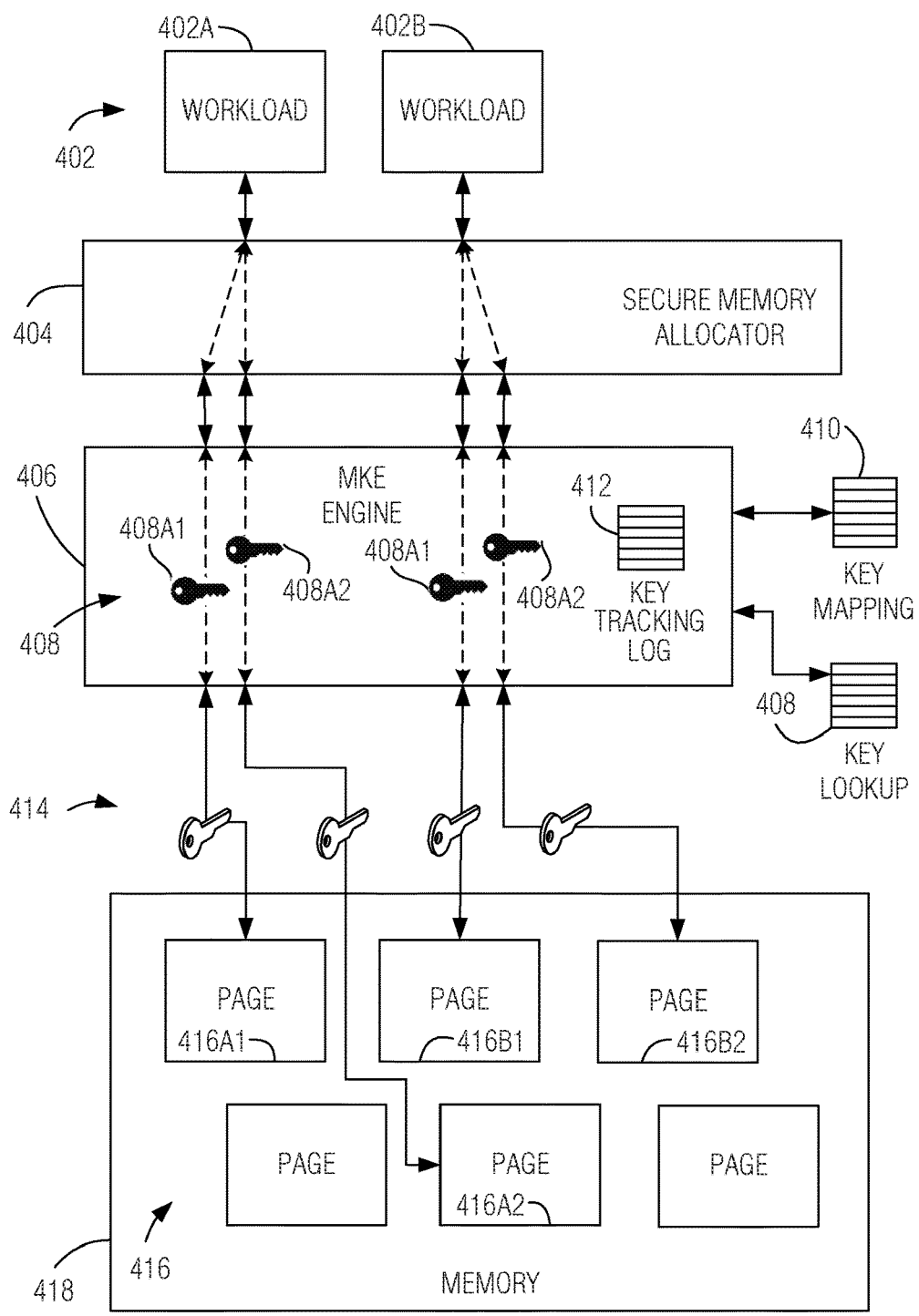
FIG. 4 is a functional diagram illustrating operation of a multi-key memory encryption arrangement according to some embodiments.

FIG. 4 is a functional diagram illustrating operation of a multi-key memory encryption arrangement according to some embodiments. Workloads 402A and 402B may be implemented as mutually-isolated VMs. Each workload 402 is to have its corresponding data optionally encrypted with its own cryptographic key, such that the other workloads (or any another entity) are not able to decipher the stored data.

Secure memory allocator 404 assigns memory addresses (e.g., which may be in units of memory pages 416 or other logical blocks of memory) to the respective workloads 402. In an example, secure memory allocator 404 associates each memory write operation with a secure/non-secure mode. In the secure mode, the data to be written is encrypted; whereas in the non-secure mode, the data to be written is left in plaintext. In an example, secure memory allocator 404 may be implemented with a hypervisor. In an operational example, as depicted in FIG. 4, secure memory allocator 404 allocates two memory pages to workload 402A, and another two memory pages to workload 402b.

Multi-key encryption (MKE) engine 406 performs cryptographic operations, and operations related to encrypting and decrypting data being written to, and read from, memory 418 (which may store pages 416). MKE engine 406 may be implemented as an isolated execution environment.

Each allocated memory page is to be associated with a key identifier (keyID) corresponding to a particular cryptographic key. Each keyID is a pointer, or reference, to a specific cryptographic key that is stored separately from memory 418, secure memory allocator 404 and workloads 402. In an example, as illustrated in FIG. 4, key lookup data store 408 may be contained in memory 418, in MKE engine 406, or elsewhere that is efficiently accessible to MKE engine 406, which is described below. Key lookup data store 408 associates keyIDs with the corresponding cryptographic keys. Key lookup data store 408 may be implemented using any suitable data structure.

In a related embodiment, the keys stored in key lookup data store 408 are themselves encrypted (e.g., wrapped with a secret key known only to the hardware platform, or derived for a fuse key or physically unclonable function (PUF) circuit).

Notably, in an example, certain keyIDs may be not associated with any key. A memory request received with this type of keyID bypasses the encryption engine completely. In an example, the bypassing may be implemented to allow for a performance benefit as well. In a related embodiment, the non-encrypted mode of operation may be selected by secure memory allocator 404 in which case the MK encryption operations are bypassed entirely for improved memory-access performance.

MKE engine 406 accesses key lookup data store 408 to retrieve keys as needed for encrypting or decrypting data being written to, or read from, memory 418. In so doing, MKE engine 406 may cache individual keys assuming they will be reused for subsequent memory accesses, for faster retrieval. Key lookup data store 408 is indexed by the keyID of the corresponding key in the indexed entry. If a new key is added to the table or an existing key entry is modified, caches of keys should be flushed and all processor translation lookaside buffer (TLB) states should be cleared.

MKE engine 406 also accesses key-mapping data store 410. Key-mapping data store 410 associates the keyIDs with physical memory addresses or pages. Key-mapping data store 410 may be maintained in memory 418, or elsewhere in a suitable storage location the computing platform from which it may be efficiently accessed by MKE engine 406. Key-mapping data store 410 may be implemented as a table or any other suitable data structure.

In an example, each entry in Key-mapping data store 410 table may be encrypted using the corresponding key domain key, thereby demonstrating that the owner of the key acknowledges ownership of the associated memory page. This is the same key that MKE engine 406 may use to encrypt (on memory writes) or decrypt (on memory reads) data to be written to, or read from, the associated memory page. In a related example, each entry of Key-mapping data store 410 has a non-encrypted part, the keyID (located at a page address-based index). Each entry also has an encrypted part, which includes the memory address, an integrity check value (which may be a fixed value) and a version number.

When a memory is accessed by a workload to perform a read or write operation, MKE engine 406 uses Key-mapping data store 410 to look up the keyID corresponding to the page-granularity address. In the present example, keyIDs 408A1 and 408A2 are associated with page addresses 416A1 and 416A2, respectively, with each corresponding to workload 402A. Similarly, keyIDs 408B1 and 408B2 are associated with page addresses 416B1 and 416B2, respectively, with each corresponding to workload 402B.

Using each keyID 408, MKE engine 406 looks up the corresponding cryptographic key from key lookup data store 408 and uses that key to decrypt the encrypted part of the P2K entry. If the entry address matches the memory address (at page granularity) of the memory read/write, then the key mapping is deemed valid and MKE engine 406 uses the key to decrypt/encrypt the data being read or written, as indicated at 414.

MKE engine 406 also accesses key-tracking log 412. Key-tracking log 412 is operated as a cache to contain addresses being currently operated upon by one or more workloads 402. Key-tracking log 412 may be implemented as part of the hardware constituting MKE engine 406, or as a set of circuitry that is isolated from access by any workload 402. In response to a protected memory-read operation, key-tracking log 412 records the memory address(es) or page(s) and keyID of the data being read. Subsequently, when the same workload 402 proceeds to write data back to the memory 418, the corresponding keyID write operation is looked up in key-tracking log 412 in lieu of having to read key-mapping data store 410 from memory.

In an example, eviction of entries from key tracking log 412 happens under two conditions. One condition is in response to eviction of the protected data line being operated upon from the processor cache. This happens when the line is written to with new secret data. The other condition is in response to silent drops from the last level cache (LLC). If data is not written, a replacement of the data line in the LLC is not written back to memory as the data has not been updated. This may result in the key tracking log 412 to fill up with read-only data.

Accordingly, in a related embodiment, a DropReadData message is employed. This is a message sent from the core to MKE engine 406 when a read-only line is silently dropped. The DropReadData message contains the address of the entry that is getting dropped. The message terminates in the MKE engine, allowing it to drop the read-only data from key tracking log 412, thereby enabling log 412 to track only what is in the core caches. Notably, in an example, a line that is originally read from memory in plaintext state is not tracked in key-tracking log 412.

Figure 5:
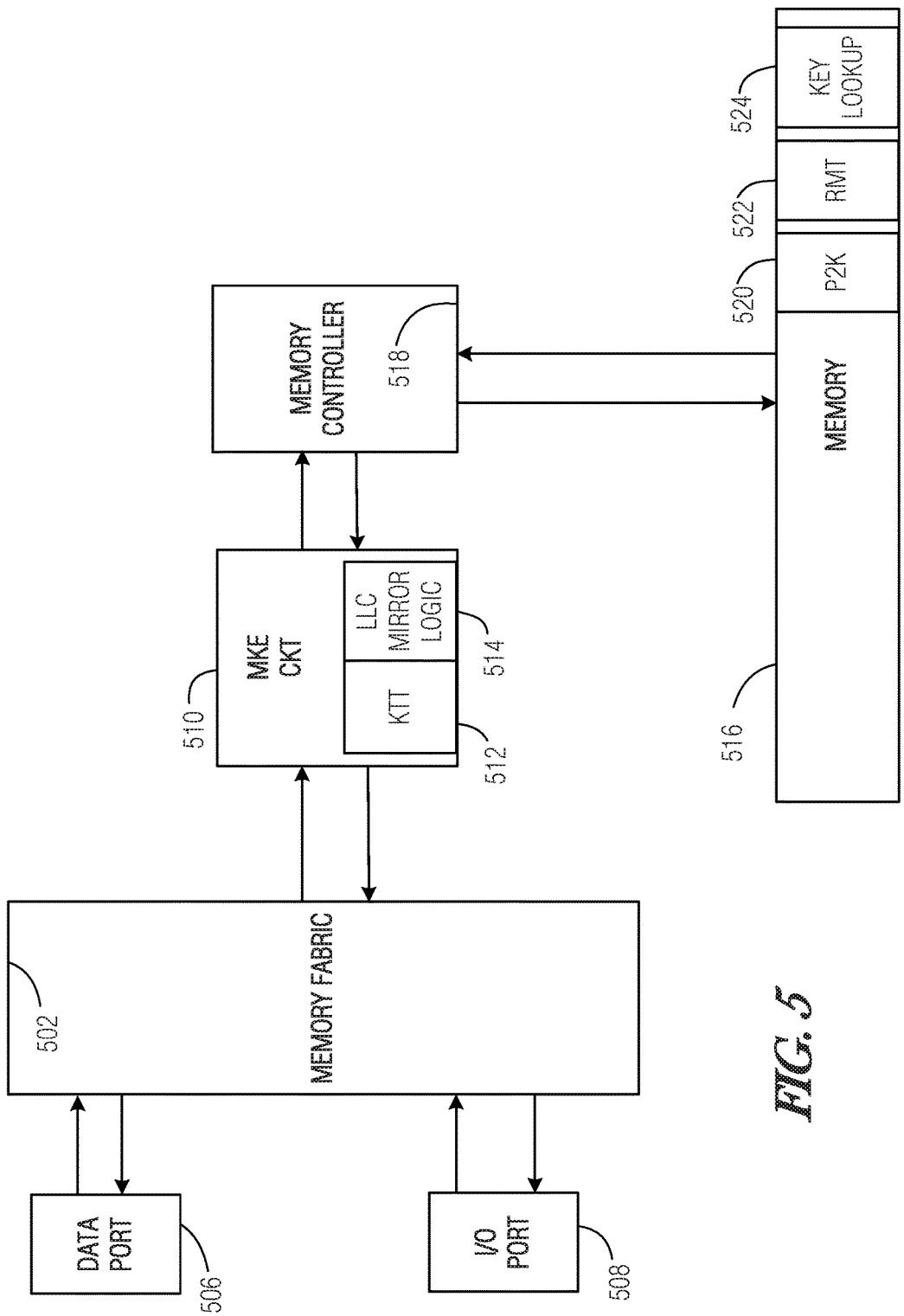
FIG. 5 is a partial system architecture diagram illustrating a machine-based implementation of a multi-key memory encryption arrangement according to various embodiments.

FIG. 5 is a partial system architecture diagram illustrating a machine-based implementation of a multi-key memory encryption arrangement according to various embodiments. Memory fabric 502 includes an adaptive interconnect that facilitates access to memory circuitry 516 via memory controller 518 and MKE circuitry 510. Data port 506 connects in-dye interconnect (IDI) agents (e.g., processor cores, graphics engines) to memory fabric 502. Input/output (I/O) port 508 connects I/O controllers to memory fabric 502 to support direct memory access by I/O devices.

MKE circuit 510 implements MKE engine 406 discussed above (FIG. 4). In an example, MKE circuit 510 is implemented using dedicated hardware circuitry, which may include an arithmetic logic unit (ALU) or specialized logic optimized for cryptographic operations, data registers, local cache memory, data and address bus interfaces, and the like. In one example, MKE circuit 510 is implemented on a dedicated co-processor. In the example depicted, MKE circuit 510 stores key-tracking table (KTT) 512 (which is an implementation of key-tracking log 412 discussed above with reference to FIG. 4) and, optionally, LLC mirror logic 514, which is discussed in greater detail below.

Memory controller 518 facilitates the logical to physical memory interface, including maintaining data in DRAM devices and executing read and write operations. Memory controller 518 may include a static RAM buffering cache for faster operations than the higher-density storage media (e.g., DRAM) that constitutes the majority of memory 516.

Memory 516 contains pages of data that may be associated with various VMs or workloads. In addition, memory 516 contains physical memory to key (P2K) table 520 (which is an implementation of key-mapping data store 410 discussed above with reference to FIG. 4), reverse mapping table (RMT) 522, and key lookup table 524. Key lookup table 524 is an implementation of key lookup data store 408 (discussed above with reference to FIG. 4).

Figure 6:
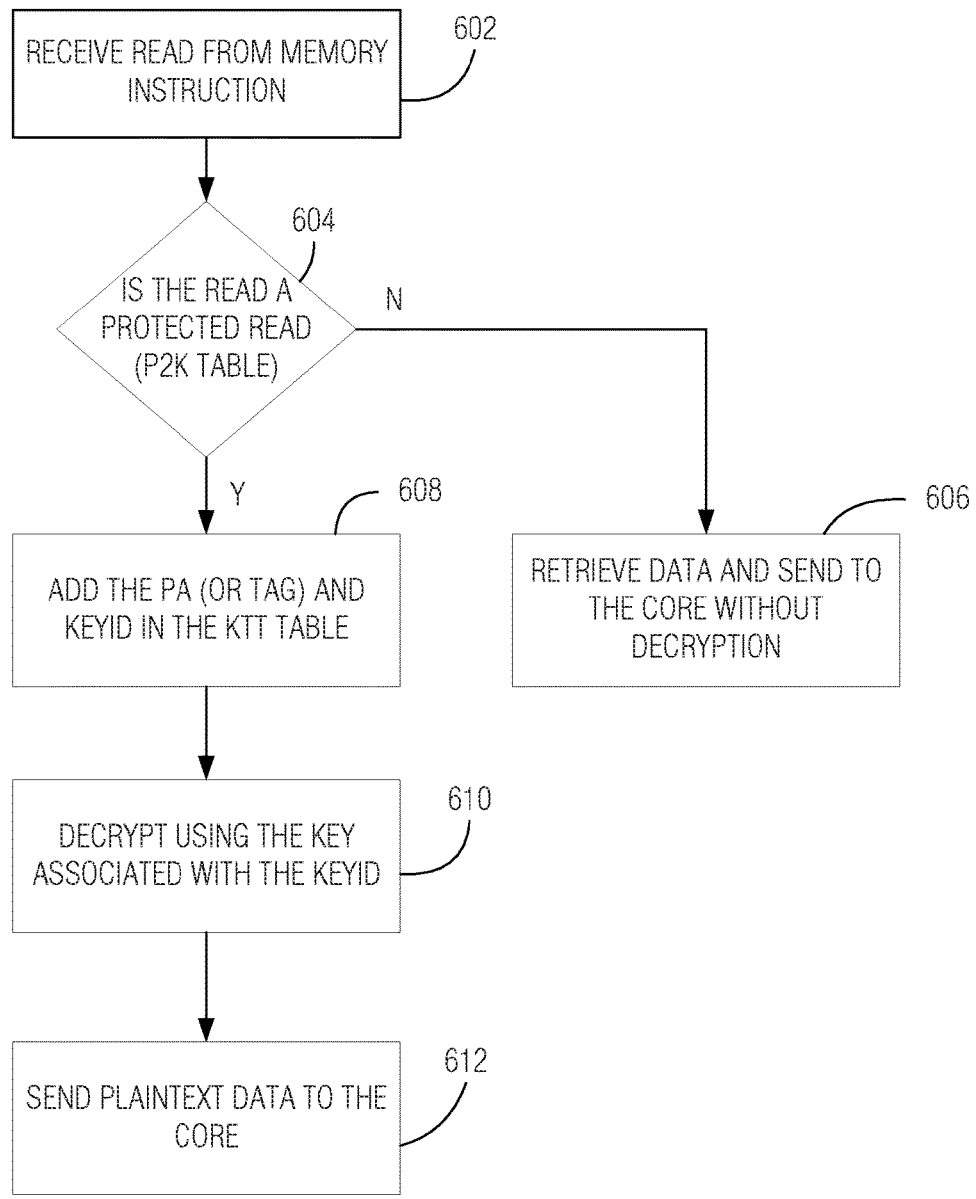
FIG. 6 is a flow diagram illustrating key tracking table (KTT)-related operations by a multi-key encryption circuit in response to a memory-read operation according to an example.

FIG. 6 is a flow diagram illustrating KTT-related operations by MKE circuit 510 in response to a memory-read operation according to an example. At 602, MKE circuit 510 receives a memory-read instruction from a processor core. At 604, MKE circuit 510 determines if the read instruction is a protected read. A protected read is a read that calls for decrypting of the stored data being read. If the read operation does not call for a protected read, the process advances to 606, where MKE circuit 510 passes the read command to memory controller 518, receives the data, and passes it to the processor core that originated the read instruction without performing any decryption. If the read operation is a protected read, the process advances to 608, where MKE circuit 510 adds the physical address (PA) or a tag representing the PA, along with the applicable keyID from P2K table 520, to KTT 512. At 610, MKE circuit 510 retrieves the cryptographic key associated with the keyID, and decrypts the data using that key, to produce the plaintext data. At 612, MKE circuit 510 passes the plaintext data to the processor core that originated the read command.

Figure 7:
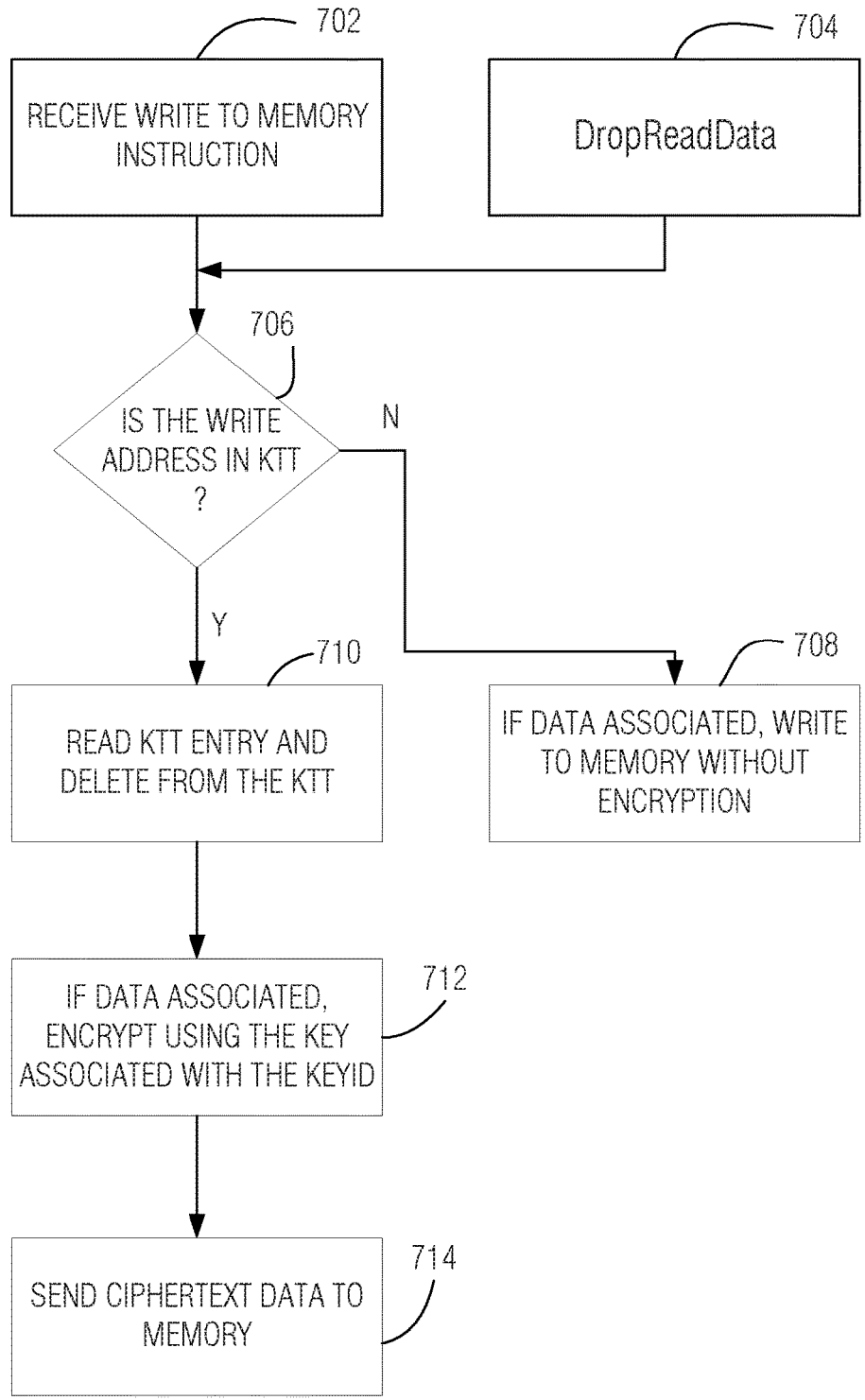
FIG. 7 is a flow diagram illustrating KTT-related operations by a multi-key encryption circuit in response to a memory-write operation according to an example.

FIG. 7 is a flow diagram illustrating KTT-related operations by MKE circuit 510 in response to a memory-write operation according to an example. At 702, MKE circuit 510 receives a write to memory instruction from a processor core. Separately, at 704, MKE circuit 510 may receive a DropReadData command from the processor core in lieu of a memory write instruction. At 706, MKE circuit 510 reads KTT 512 and determines if the address associated with the write or DropReadData command is present in KTT 512. In the case where the address is not in KTT 512, the process advances to 708, where MKE circuit 510 passes the data to be written, if any, to memory controller 518, without performing any encryption of the data. Otherwise, in the case where the write-to address is present in KTT 512, operation 710 reads the KTT entry and deletes the corresponding entry from KTT 512. At 712, if there was data to be written, MKE circuit 510 encrypts the data using the cryptographic key associated with the keyID taken from KTT 512 (and has now been deleted in the KTT), to produce ciphertext data. At 714, the ciphertext data is passed to memory controller 518 for writing to memory 516.

Returning to FIG. 5, LLC mirror logic 514 is an optional feature that tracks the LLC state in MKE circuit 510, which essentially amounts to storing the tags of the LLC along with the KEYID associated with each of the data lines locally in the memory provision of MKE circuit 510. LLC mirror logic 514 allows KTT 512 to be managed by MKE circuit 510 without reliance on the DropReadData messaging.

RMT 522 is used to determine if a physical page in memory is assigned to the correct domain and its mapping to the guest physical address is correct. RMT 522 is a core-managed table that contains entries associating guest physical addresses (e.g., what each workload or VM is presented), and the actual hardware physical addresses as understood by memory controller 518 to which the guest physical addresses are mapped, as well as the VM/workload-to-memory page allocations, and read/write permissions associated with the addresses. The entry is encrypted with the domain key to allow the domain to authorize the memory mapping. On a TLB miss, RMT 522 is looked up before installing the mapping in the TLB. Any attack's attempt to map a page belonging to a different domain is disallowed as the incorrect key would be used to decrypt the RMT entry and the implicit integrity maintained in each RMT entry would hence fail.

RMT 522 and P2K table 520 may be used together. In response to a memory read, MKE circuit 510 uses P2K table 520 to determine the keyID and then uses the keyID to look up the key to be used to decrypt the data being read from memory. The keys may be stored in key lookup table 524 in memory 516, wrapped with a key known only to the MT encryption circuit 510. Similar to other memory accesses, when an RMT entry is read from RMT 522, P2K table 520 is looked up to obtain the associated keyID and a correctly-decrypted RMT entry verifies the guest physical address to hardware physical address mapping.

One advantage of the embodiments illustrated in FIGS. 4-5 is their immunity from certain types of hacking attacks, in which an attacker with hardware access to the system causes a workload/VM to leak information in plaintext. According to a hardware-replay attack, the attacker replays, or modifies, a key table stored in memory during a time window falling between a read operation and a write operation. The attack causes the read operation to be decrypted with the correct key associated with the workload, but the operation bypasses the cryptographic protection (e.g., data is written back in plaintext) as guided by the replayed key table in memory.

Advantageously, some embodiments described herein recognize and resolve the vulnerability window between the read and write operations with the use of key tracking log 412 (FIG. 4), which may be implemented as KTT 512 (FIG. 5), as described above. For instance, use of key tracking log 412, or KTT 512 obviates the need to re-read the P2K table 410, 520 from memory 418, 516 (which may be compromised by an attack) for a write operation that follows a read operation.

In addition to causing confidentiality leaks, an attacker could also cause cross-domain injection attacks. As one example, an attacker monitors memory access by a first workload/VM and records a copy of a physical page, along with the corresponding P2K table entry. Later, when the physical page is allocated to a second workload/VM, the attacker replays, or replaces, the page contents and the P2K table entry corresponding to the page with the earlier-recorded copy of the page contents and P2K table entry. This will result in the first workload's data or the VM's data being decrypted correctly and sent to the second workload/VM. In this attack, the second workload/VM remains unaware that it was fed incorrect data.

According to a related embodiment, a salting technique is utilized to immunize the system from cross-domain injection attacks. Salting of a workload or a VM recognizes that the processor core is always aware of the identity of the VM or workload it is executing. For each page created and associated with a workload, a random or random-like number is associated by the processor core. This random or random-like number is stored in both the RMT and P2K entry for the page. This unique random number associated with each workload is referred to as the VM or workload salt.

Figure 8:
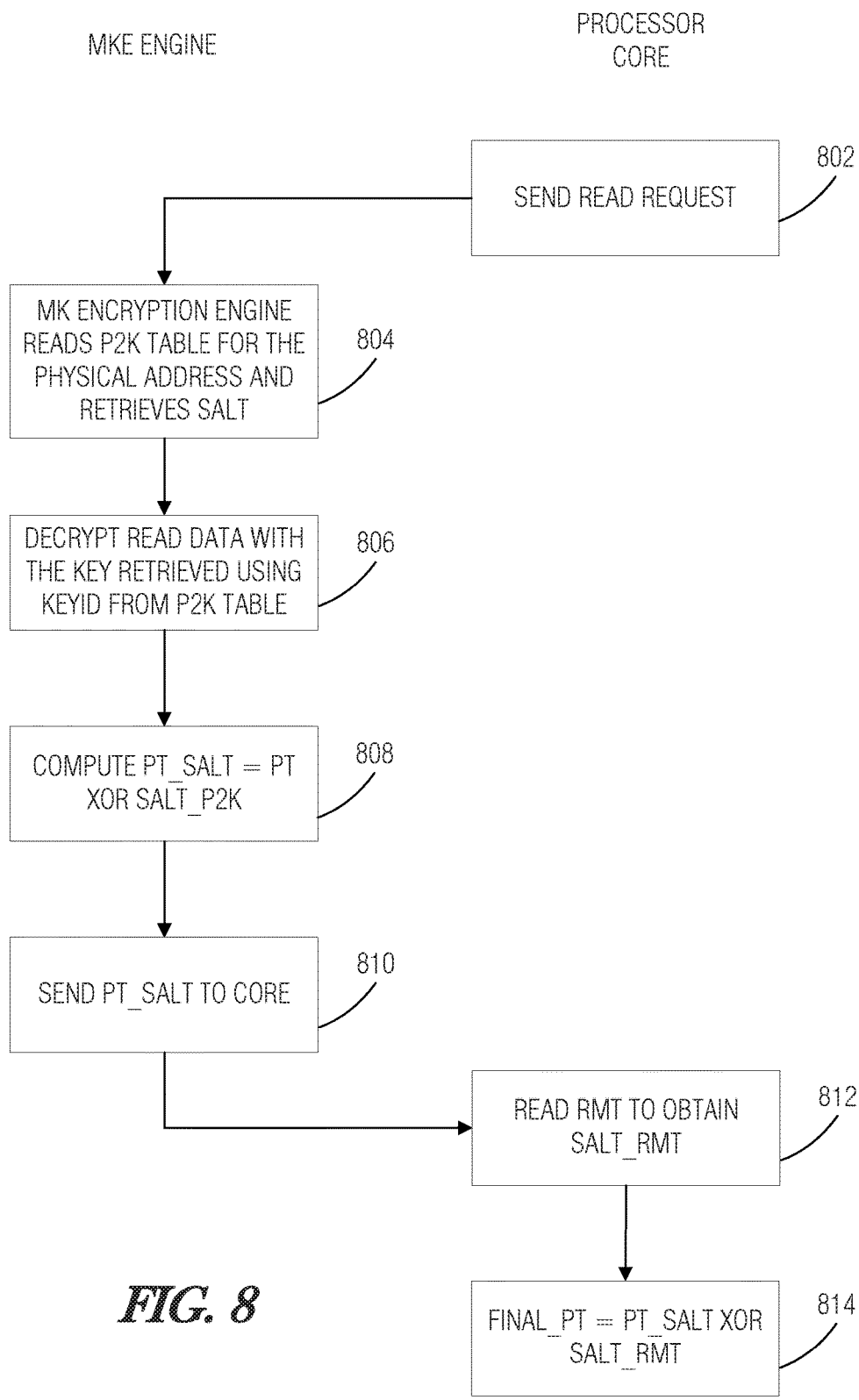
FIG. 8 is a flow diagram illustrates operations performed by a multi-key encryption engine in cooperation with a processor core according to an embodiment, in the utilization of a salting technique to defeat a cross-domain replay attack, for example.

FIG. 8 is a flow diagram illustrates operations performed by a MKE engine, such as MKE engine 406 (FIG. 4), in cooperation with a processor core, in the utilization of a salting technique. At 802, the processor core sends a read request from to MKE engine 406. At 804, MK encryption 406 reads P2K table 410 to obtain the keyID, physical address, and salt value from the P2K table. At 806, MKE engine 406 decrypts the ciphertext data as read from memory 418 using the cryptographic key referenced by the keyID from P2K table 410 to produce a plaintext version of the data (PT). At 808, MKE engine 406 406 computes an XOR of the PT with the salt from the P2K table, SALT_P2K, to compute a salted version of the data, PT_SALT. At 810, MKE engine 406 passes the salted plaintext data, PT_SALT, to the processor core requesting the read. At 812 the processor core retrieves the salt value that is stored in the RMT entry, SALT_RMT. At 814, the processor core uses SALT_RMT for an XOR operation with the salted data received from the MKE engine, PT_SALT, to produce a final plaintext value, FINAL_PT. If a cross-domain replay attack outlined above is attempted, the two salts from P2K and RMT will not match and the final value, FINAL_PT would result in garbage data, thereby defeating the attack.

An attacker might try to modify the RMT as well to replace the current RMT entry with the old RMT entry. However, RMT is core-managed and the core knows the identity of the currently-executing VM or workload. Hence, an RMT entry for a different domain cannot be used without detection. Additionally, an attacker is unable to modify part of the RMT entry without detection as the fields in the RMT are encrypted with implicit integrity. Hence, any attempt to change the salt alone in an RMT entry without changing the domain ID will be detected by the core as the implicit integrity check will fail.

Additional Notes & Examples

Example 1 is apparatus for secure memory access in a computing platform, the apparatus comprising: computing hardware, including at least one processor core, memory, and a memory interface communicatively coupling the at least one processor core, wherein the at least one processor core is to perform a plurality of workloads, each workload utilizing allocated portions of memory, and wherein the memory interface includes, a multi-key encryption (MKE) engine; a storage medium containing a key-mapping data store accessible to the MKE engine, containing associations between identifiers of portions of the memory and corresponding key identification data; and a storage medium containing a key tracking log accessible to the MKE engine; wherein the MKE engine is to: perform key-based cryptography operations on data to be read from, or written to, the memory to isolate certain ones of the portions of the memory from workloads to which those portions of the memory are not allocated; determine cryptographic keys for the cryptography operations based on the key-mapping data store; and temporarily store entries in the key tracking log containing the identifiers of the portions of the memory and the corresponding key identification data for those portions of memory during memory-access operations of those portions of memory.

In Example 2, the subject matter of Example 1 includes, wherein the MKE engine is to: store, in the key tracking log, a first entry representing a first memory portion identifier and a corresponding first key identifier in response to a read operation calling for reading of a first portion of memory corresponding to the first memory portion identifier; and in response to a subsequent write operation calling for writing to the first portion of memory, read the first entry from the key tracking log to retrieve the first key identifier, and apply a first cryptographic key corresponding to the first key identifier to encrypt data to be written to the first portion of memory prior to writing of that data.

In Example 3, the subject matter of Examples 1-2 includes, wherein the MKE engine and the key tracking log are each communicatively isolated from access by the at least one processor core.

In Example 4, the subject matter of Examples 1-3 includes, wherein the MKE engine includes a data store, and wherein the key tracking log is contained in the data store of the MKE engine.

In Example 5, the subject matter of Examples 1-4 includes, wherein each one of the plurality of workloads is implemented as a virtual machine.

In Example 6, the subject matter of Examples 1-5 includes, wherein the key-mapping data store is contained in the memory.

In Example 7, the subject matter of Examples 1-6 includes, wherein the allocated portions of memory are memory pages.

In Example 8, the subject matter of Examples 1-7 includes, a key lookup data store containing a set of cryptographic keys, each of the cryptographic keys associated with a key identifier of the key identification data contained in the key-mapping data store.

In Example 9, the subject matter of Example 8 includes, wherein the key lookup data store is contained in the memory, and wherein each of the cryptographic keys in the key lookup data store is encrypted such that only the MKE engine is able to recover the cryptographic keys.

In Example 10, the subject matter of Examples 1-9 includes, wherein the MKE engine is to receive a command from the at least one processor core to remove an entry from the key tracking log.

In Example 11, the subject matter of Examples 1-10 includes, wherein the MKE engine is to store a copy of a last level cache (LLC) of the at least one processor core.

In Example 12, the subject matter of Examples 1-11 includes, wherein a unique salt value is associated with each workload and stored in a processor-core-managed data store, and wherein a copy of each unique salt value associated with each workload is stored in a MKE engine-managed data store, and wherein each unique salt value is associated with allocated portions of memory corresponding to each respective workload; and wherein in response to a read operation by a first workload to retrieve a first set of data from the memory, the MKE engine is to combine the first set of data with an associated first salt value from the MKE engine-managed data store to produce a first salted value prior to passing the first salted data to the at least one processor on which the first workload is executed.

In Example 13, the subject matter of Example 12 includes, wherein the MKE engine-managed data store and the processor-core-managed data store are each contained within the memory.

In Example 14, the subject matter of Examples 12-13 includes, wherein the at least one processor core, in response to receiving first salted data in response to a read operation, is to combine the first salted data with an associated salt value from the processor-core-managed data store to recover the first set of data.

Example 15 is a method for secure memory access in a computing platform, the method comprising: executing, by at least one processor core of the computing platform, a plurality of workloads, each workload utilizing allocated portions of memory; and performing key-based cryptography by a multi-key encryption (MKE) engine, including performing operations on data to be read from, or written to, portions of the memory to isolate certain ones of the portions of the memory from workloads to which those portions of the memory are not allocated; maintaining a key-mapping data store accessible to the MKE engine and containing associations between identifiers of portions of the memory, and corresponding key identification data from which the MKE engine determines cryptographic keys with which to perform the cryptographic isolation; and maintaining, by the MKE engine, a key tracking log, wherein the MKE engine is to temporarily store entries in the key tracking log containing the identifiers of the portions of the memory and the corresponding key identification data for those portions of memory during memory-access operations of those portions of memory.

In Example 16, the subject matter of Example 15 includes, wherein the MKE engine performs: storing, in the key tracking log, a first entry representing a first memory portion identifier and a corresponding first key identifier in response to a read operation calling for reading of a first portion of memory corresponding to the first memory portion identifier; and in response to a subsequent write operation calling for writing to the first portion of memory, reading the first entry from the key tracking log to retrieve the first key identifier, and applying a first cryptographic key corresponding to the first key identifier to encrypt data to be written to the first portion of memory prior to writing of that data.

In Example 17, the subject matter of Examples 15-16 includes, wherein the MKE engine and the key tracking log are each communicatively isolated from access by the at least one processor core.

In Example 18, the subject matter of Examples 15-17 includes, wherein each one of the plurality of workloads is implemented as a virtual machine.

In Example 19, the subject matter of Examples 15-18 includes, wherein the key-mapping data store is contained in the memory.

In Example 20, the subject matter of Examples 15-19 includes, wherein the allocated portions of memory are memory pages.

In Example 21, the subject matter of Examples 15-20 includes, maintaining a key lookup data store containing a set of cryptographic keys, each of the cryptographic keys associated with a key identifier of the key identification data contained in the key-mapping data store.

In Example 22, the subject matter of Example 21 includes, wherein the key lookup data store is contained in the memory, and wherein each of the cryptographic keys in the key lookup data store is encrypted such that only the MKE engine is able to recover the cryptographic keys.

In Example 23, the subject matter of Examples 15-22 includes, wherein the MKE engine receives and processes a command from the at least one processor core to remove an entry from the key tracking log.

In Example 24, the subject matter of Examples 15-23 includes, wherein the MKE engine stores a copy of a last level cache (LLC) of the at least one processor core.

In Example 25, the subject matter of Examples 15-24 includes, wherein a unique salt value is associated with each workload and stored in a processor-core-managed data store, and wherein a copy of each unique salt value associated with each workload is stored in a MKE engine-managed data store, and wherein each unique salt value is associated with allocated portions of memory corresponding to each respective workload; and wherein in response to a read operation by a first workload to retrieve a first set of data from the memory, the MKE engine combines the first set of data with an associated first salt value from the MKE engine-managed data store to produce a first salted value prior to passing the first salted data to the at least one processor on which the first workload is executed.

In Example 26, the subject matter of Example 25 includes, wherein the at least one processor core, in response to receiving first salted data in response to a read operation, combines the first salted data with an associated salt value from the processor-core-managed data store to recover the first set of data.

Example 27 is at least one machine-readable medium containing instructions that, when executed by a computing platform, cause the computing platform to: perform, by at least one processor core of the computing platform, a plurality of workloads, each workload utilizing allocated portions of memory; and perform key-based cryptography, by a multi-key encryption (MKE) engine, including operations on data to be read from, or written to, portions of the memory to isolate certain ones of the portions of the memory from workloads to which those portions of the memory are not allocated; maintain a key-mapping data store that is accessible to the MKE engine and contains associations between identifiers of portions of the memory, and corresponding key identification data from which cryptographic keys are determined by the MKE engine to perform the cryptographic isolation; and maintain, by the MKE engine, a key tracking log, and cause the MKE engine to temporarily store entries in the key tracking log containing the identifiers of the portions of the memory and the corresponding key identification data for those portions of memory during memory-access operations of those portions of memory.

In Example 28, the subject matter of Example 27 includes, wherein the instructions are to cause the MKE engine of the computing platform to: store, in the key tracking log, a first entry representing a first memory portion identifier and a corresponding first key identifier in response to a read operation calling for reading of a first portion of memory corresponding to the first memory portion identifier; and in response to a subsequent write operation calling for writing to the first portion of memory, read the first entry from the key tracking log to retrieve the first key identifier, and apply a first cryptographic key corresponding to the first key identifier to encrypt data to be written to the first portion of memory prior to writing of that data.

In Example 29, the subject matter of Examples 27-28 includes, wherein the MKE engine and the key tracking log are each communicatively isolated from access by the at least one processor core.

In Example 30, the subject matter of Examples 27-29 includes, wherein each one of the plurality of workloads is implemented as a virtual machine.

In Example 31, the subject matter of Examples 27-30 includes, wherein the key-mapping data store is contained in the memory.

In Example 32, the subject matter of Examples 27-31 includes, wherein the allocated portions of memory are memory pages.

In Example 33, the subject matter of Examples 27-32 includes, wherein the instructions are to cause the MKE engine to: maintain a key lookup data store containing a set of cryptographic keys, each of the cryptographic keys associated with a key identifier of the key identification data contained in the key-mapping data store.

In Example 34, the subject matter of Example 33 includes, wherein the key lookup data store is to be contained in the memory, and wherein each of the cryptographic keys in the key lookup data store is to be encrypted such that only the MKE engine is able to recover the cryptographic keys.

In Example 35, the subject matter of Examples 27-34 includes, wherein according to the instructions, the MKE engine receives and processes a command from the at least one processor core to remove an entry from the key tracking log.

In Example 36, the subject matter of Examples 27-35 includes, wherein according to the instructions, the MKE engine stores a copy of a last level cache (LLC) of the at least one processor core.

In Example 37, the subject matter of Examples 27-36 includes, wherein the instructions are to cause the computing platform to associate a unique salt value with each workload and stored in a processor-core-managed data store, wherein a copy of each unique salt value associated with each workload is stored in a MKE engine-managed data store, and wherein each unique salt value is associated with allocated portions of memory corresponding to each respective workload; and in response to a read operation by a first workload to retrieve a first set of data from the memory, the MKE engine is to combine the first set of data with an associated first salt value from the MKE engine-managed data store to produce a first salted value prior to passing the first salted data to the at least one processor on which the first workload is executed.

In Example 38, the subject matter of Example 37 includes, wherein the instructions are to cause the at least one processor core of the computing platform, in response to receiving first salted data in response to a read operation, to combine the first salted data with an associated salt value from the processor-core-managed data store to recover the first set of data.

Example 39 is a system for secure memory access in a computing platform, the system comprising: means for executing, by at least one processor core of the computing platform, a plurality of workloads, each workload utilizing allocated portions of memory; and means for performing key-based cryptography, including performing operations on data to be read from, or written to, portions of the memory to isolate certain ones of the portions of the memory from workloads to which those portions of the memory are not allocated; means for maintaining, by the means for performing key-based cryptography, a key-mapping data store containing associations between identifiers of portions of the memory, and corresponding key identification data from which cryptographic keys are determined for use by the means for performing key-based cryptography to perform the cryptographic isolation; and means for maintaining, by the means for performing key-based cryptography, a key tracking log, wherein the means for performing key-based cryptography is to temporarily store entries in the key tracking log containing the identifiers of the portions of the memory and the corresponding key identification data for those portions of memory during memory-access operations of those portions of memory.

In Example 40, the subject matter of Example 39 includes, wherein the means for performing key-based cryptography include: means for storing, in the key tracking log, a first entry representing a first memory portion identifier and a corresponding first key identifier in response to a read operation calling for reading of a first portion of memory corresponding to the first memory portion identifier; and means for in response to a subsequent write operation calling for writing to the first portion of memory, reading the first entry from the key tracking log to retrieve the first key identifier, and applying a first cryptographic key corresponding to the first key identifier to encrypt data to be written to the first portion of memory prior to writing of that data.

In Example 41, the subject matter of Examples 39-40 includes, wherein the means for performing key-based cryptography and the key tracking log are each communicatively isolated from access by the at least one processor core.

In Example 42, the subject matter of Examples 39-41 includes, wherein each one of the plurality of workloads is implemented as a virtual machine.

In Example 43, the subject matter of Examples 39-42 includes, wherein the key-mapping data store is contained in the memory.

In Example 44, the subject matter of Examples 39-43 includes, wherein the allocated portions of memory are memory pages.

In Example 45, the subject matter of Examples 39-44 includes, maintaining a key lookup data store containing a set of cryptographic keys, each of the cryptographic keys associated with a key identifier of the key identification data contained in the key-mapping data store.

In Example 46, the subject matter of Example 45 includes, wherein the key lookup data store is contained in the memory, and wherein each of the cryptographic keys in the key lookup data store is encrypted such that only the means for performing key-based cryptography is able to recover the cryptographic keys.

In Example 47, the subject matter of Examples 39-46 includes, wherein the means for performing key-based cryptography receives and processes a command from the at least one processor core to remove an entry from the key tracking log.

In Example 48, the subject matter of Examples 39-47 includes, wherein the means for performing key-based cryptography stores a copy of a last level cache (LLC) of the at least one processor core.

In Example 49, the subject matter of Examples 39-48 includes, wherein a unique salt value is associated with each workload and stored in a processor-core-managed data store, and wherein a copy of each unique salt value associated with each workload is stored in a means for performing key-based cryptography-managed data store, and wherein each unique salt value is associated with allocated portions of memory corresponding to each respective workload; and wherein in response to a read operation by a first workload to retrieve a first set of data from the memory, the means for performing key-based cryptography combines the first set of data with an associated first salt value from the MKE engine-managed data store to produce a first salted value prior to passing the first salted data to the at least one processor on which the first workload is executed.

In Example 50, the subject matter of Example 49 includes, wherein the at least one processor core, in response to receiving first salted data in response to a read operation, combines the first salted data with an associated salt value from the processor-core-managed data store to recover the first set of data.

Example 51 is at least one machine-readable medium including instructions that, when executed by processing circuitry, cause the processing circuitry to perform operations to implement of any of Examples 1-50.

Example 52 is an apparatus comprising means to implement of any of Examples 1-50.

Example 53 is a system to implement of any of Examples 1-50.

Example 54 is a method to implement of any of Examples 1-50.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. Apparatus for secure memory access in a computing platform, the apparatus comprising:
    computing hardware, including at least one processor core, memory, and a memory interface communicatively coupling the at least one processor core, wherein the at least one processor core is to perform a plurality of workloads, each workload utilizing allocated portions of memory, and wherein the memory interface includes a multi-key encryption (MKE) engine;
    a storage medium containing a key-mapping data store accessible to the MKE engine, containing associations between identifiers of portions of the memory and corresponding key identification data; and
    a storage medium containing a key tracking log accessible to the MKE engine;
    wherein the MKE engine is to:
    perform key-based cryptography operations on data to be read from, or written to, the memory to isolate certain ones of the portions of the memory from workloads to which those portions of the memory are not allocated;
    determine cryptographic keys for the cryptography operations based on the key-mapping data store; and
    temporarily store entries in the key tracking log containing the identifiers of the portions of the memory and the corresponding key identification data for those portions of memory during memory-access operations of those portions of memory.

2. The apparatus of claim 1, wherein the MKE engine is to:
    store, in the key tracking log, a first entry representing a first memory portion identifier and a corresponding first key identifier in response to a read operation calling for reading of a first portion of memory corresponding to the first memory portion identifier; and
    in response to a subsequent write operation calling for writing to the first portion of memory, read the first entry from the key tracking log to retrieve the first key identifier, and apply a first cryptographic key corresponding to the first key identifier to encrypt data to be written to the first portion of memory prior to writing of that data.

3. The apparatus of claim 1, wherein the MKE engine and the key tracking log are each communicatively isolated from access by the at least one processor core.

4. The apparatus of claim 1, wherein the MKE engine includes a data store, and wherein the key tracking log is contained in the data store of the MKE engine.

5. The apparatus of claim 1, wherein the key-mapping data store is contained in the memory.

6. The apparatus of claim 1, further comprising:
    a key lookup data store containing a set of cryptographic keys, each of the cryptographic keys associated with a key identifier of the key identification data contained in the key-mapping data store.

7. The apparatus of claim 6, wherein the key lookup data store is contained in the memory, and wherein each of the cryptographic keys in the key lookup data store is encrypted such that only the MKE engine is able to recover the cryptographic keys.

8. The apparatus of claim 1, wherein the MKE engine is to receive a command from the at least one processor core to remove an entry from the key tracking log.

9. The apparatus of claim 1, wherein the MKE engine is to store a copy of a last level cache (LLC) of the at least one processor core.

10. The apparatus of claim 1, wherein a unique salt value is associated with each workload and stored in a processor-core-managed data store, and wherein a copy of each unique salt value associated with each workload is stored in a MKE engine-managed data store, and wherein each unique salt value is associated with allocated portions of memory corresponding to each respective workload; and
    wherein in response to a read operation by a first workload to retrieve a first set of data from the memory, the MKE engine is to combine the first set of data with an associated first salt value from the MKE engine-managed data store to produce a first salted value prior to passing the first salted data to the at least one processor on which the first workload is executed.

11. The apparatus of claim 10, wherein the MKE engine-managed data store and the processor-core-managed data store are each contained within the memory.

12. The apparatus of claim 10, wherein the at least one processor core, in response to receiving first salted data in response to a read operation, is to combine the first salted data with an associated salt value from the processor-core-managed data store to recover the first set of data.

13. A method for secure memory access in a computing platform, the method comprising:
    executing, by at least one processor core of the computing platform, a plurality of workloads, each workload utilizing allocated portions of memory; and
    performing key-based cryptography by a multi-key encryption (MKE) engine, including performing operations on data to be read from, or written to, portions of the memory to isolate certain ones of the portions of the memory from workloads to which those portions of the memory are not allocated;
    maintaining a key-mapping data store accessible to the MKE engine and containing associations between identifiers of portions of the memory, and corresponding key identification data from which the MKE engine determines cryptographic keys with which to perform the cryptographic isolation; and
    maintaining, by the MKE engine, a key tracking log, wherein the MKE engine is to temporarily store entries in the key tracking log containing the identifiers of the portions of the memory and the corresponding key identification data for those portions of memory during memory-access operations of those portions of memory.

14. The method of claim 13, wherein the MKE engine performs:
    storing, in the key tracking log, a first entry representing a first memory portion identifier and a corresponding first key identifier in response to a read operation calling for reading of a first portion of memory corresponding to the first memory portion identifier; and
    in response to a subsequent write operation calling for writing to the first portion of memory, reading the first entry from the key tracking log to retrieve the first key identifier, and applying a first cryptographic key corresponding to the first key identifier to encrypt data to be written to the first portion of memory prior to writing of that data.

15. The method of claim 13, wherein a unique salt value is associated with each workload and stored in a processor-core-managed data store, and wherein a copy of each unique salt value associated with each workload is stored in a MKE engine-managed data store, and wherein each unique salt value is associated with allocated portions of memory corresponding to each respective workload; and wherein in response to a read operation by a first workload to retrieve a first set of data from the memory, the MKE engine combines the first set of data with an associated first salt value from the MKE engine-managed data store to produce a first salted value prior to passing the first salted data to the at least one processor on which the first workload is executed.

16. The method of claim 15, wherein the at least one processor core, in response to receiving first salted data in response to a read operation, combines the first salted data with an associated salt value from the processor-core-managed data store to recover the first set of data.

17. At least one non-transitory machine-readable medium containing instructions that, when executed by a computing platform, cause the computing platform to:

perform, by at least one processor core of the computing platform, a plurality of workloads, each workload utilizing allocated portions of memory; and perform key-based cryptography, by a multi-key encryption (MKE) engine, including operations on data to be read from, or written to, portions of the memory to isolate certain ones of the portions of the memory from workloads to which those portions of the memory are not allocated;

maintain a key-mapping data store that is accessible to the MKE engine and contains associations between identifiers of portions of the memory, and corresponding key identification data from which cryptographic keys are determined by the MKE engine to perform the cryptographic isolation; and maintain, by the MKE engine, a key tracking log, and cause the MKE engine to temporarily store entries in the key tracking log containing the identifiers of the portions of the memory and the corresponding key identification data for those portions of memory during memory-access operations of those portions of memory.

18. The at least one machine-readable medium of claim 17, wherein the instructions are to cause the MKE engine of the computing platform to:

store, in the key tracking log, a first entry representing a first memory portion identifier and a corresponding first key identifier in response to a read operation calling for reading of a first portion of memory corresponding to the first memory portion identifier; and in response to a subsequent write operation calling for writing to the first portion of memory, read the first entry from the key tracking log to retrieve the first key identifier, and apply a first cryptographic key corresponding to the first key identifier to encrypt data to be written to the first portion of memory prior to writing of that data.

19. The at least one machine-readable medium of claim 17, wherein the key-mapping data store is contained in the memory.

20. The at least one machine-readable medium of claim 17, wherein the instructions are to cause the MKE engine to:

maintain a key lookup data store containing a set of cryptographic keys, each of the cryptographic keys associated with a key identifier of the key identification data contained in the key-mapping data store.

21. The at least one machine-readable medium of claim 20, wherein the key lookup data store is to be contained in the memory, and wherein each of the cryptographic keys in the key lookup data store is to be encrypted such that only the MKE engine is able to recover the cryptographic keys.

22. The at least one machine-readable medium of claim 17, wherein according to the instructions, the MKE engine receives and processes a command from the at least one processor core to remove an entry from the key tracking log.

23. The at least one machine-readable medium of claim 17, wherein according to the instructions, the MKE engine stores a copy of a last level cache (LLC) of the at least one processor core.

24. The at least one machine-readable medium of claim 17, wherein the instructions are to cause the computing platform to associate a unique salt value with each workload and stored in a processor-core-managed data store, wherein a copy of each unique salt value associated with each workload is stored in a MKE engine-managed data store, and wherein each unique salt value is associated with allocated portions of memory corresponding to each respective workload; and in response to a read operation by a first workload to retrieve a first set of data from the memory, the MKE engine is to combine the first set of data with an associated first salt value from the MKE engine-managed data store to produce a first salted value prior to passing the first salted data to the at least one processor on which the first workload is executed.

25. The at least one machine-readable medium of claim 24, wherein the instructions are to cause the at least one processor core of the computing platform, in response to receiving first salted data in response to a read operation, to combine the first salted data with an associated salt value from the processor-core-managed data store to recover the first set of data.

* * * * *